US008482600B2

(12) United States Patent
Lee

(10) Patent No.: US 8,482,600 B2
(45) Date of Patent: Jul. 9, 2013

(54) OSMU (ONE SOURCE MULTI USE)-TYPE STEREOSCOPIC CAMERA AND METHOD OF MAKING STEREOSCOPIC VIDEO CONTENT THEREOF

(75) Inventor: Youn-Woo Lee, Anyang-si (KR)

(73) Assignee: Stereopia Co., Ltd., Seoul (KR)

( * ) Notice: Subject to any disclaimer, the term of this patent is extended or adjusted under 35 U.S.C. 154(b) by 610 days.

(21) Appl. No.: 12/734,017

(22) PCT Filed: Oct. 8, 2008

(86) PCT No.: PCT/KR2008/005897
§ 371 (c)(1),
(2), (4) Date: Apr. 5, 2010

(87) PCT Pub. No.: WO2009/048254
PCT Pub. Date: Apr. 16, 2009

(65) Prior Publication Data
US 2010/0231691 A1    Sep. 16, 2010

(30) Foreign Application Priority Data

Oct. 8, 2007  (KR) .................. 10-2007-0100904

(51) Int. Cl.
*H04N 13/02* (2006.01)
*H04N 13/00* (2006.01)
(52) U.S. Cl.
USPC .................. 348/47; 348/42; 348/46
(58) Field of Classification Search
USPC ..................................... 348/42–60
See application file for complete search history.

(56) References Cited

U.S. PATENT DOCUMENTS

| 6,005,607 | A  | * | 12/1999 | Uomori et al. ................. 348/42 |
| 6,301,446 | B1 | * | 10/2001 | Inaba ............................ 396/324 |
| 6,512,892 | B1 | * | 1/2003 | Montgomery et al. ....... 396/326 |
| 7,493,037 | B2 |   | 2/2009 | Inaba |
| 2001/0019450 | A1 | * | 9/2001 | Ogino .......................... 359/462 |
| 2004/0057612 | A1 | * | 3/2004 | Tabata .......................... 382/154 |
| 2007/0257902 | A1 | * | 11/2007 | Satoh et al. ................. 345/419 |

FOREIGN PATENT DOCUMENTS

| JP | 2006-303832 | 11/2006 |
| KR | 10-2001-0003426 | 1/2001 |
| KR | 10-2006-0009178 | 1/2006 |

OTHER PUBLICATIONS

International Search Report.

* cited by examiner

*Primary Examiner* — Joseph Ustaris
*Assistant Examiner* — On S Mung
(74) *Attorney, Agent, or Firm* — Harness, Dickey & Pierce, P.L.C.

(57) ABSTRACT

A one source multi use (OSMU)-type stereoscopic camera is disclosed. The stereoscopic camera includes left and right cameras of which lenses are aligned with parallel optical axes, a separation adjustment unit for adjusting the separation between the cameras, a critical parallax computing unit, a camera separation computing unit, and an image storage unit. The critical parallax computing unit adjusts the focus of the stereoscopic camera to an object and determines the far point of an image so that a maximum critical parallax is computed based on a far point limit parallax of a medium-size display. The camera separation computing unit computes the separation between the optical axes based on the computed critical parallax and drives the separation adjustment unit. The image storage unit stores images photographed by the readjusted cameras. Therefore, stereoscopic video made according to the present invention may be viewed on various sizes of displays.

29 Claims, 13 Drawing Sheets

OSMU (ONE SOURCE MULTI USE)-TYPE STEREOSCOPIC CAMERA AND METHOD OF MAKING STEREOSCOPIC VIDEO CONTENT THEREOF

TECHNICAL FIELD

The present invention relates to a one source multi use (OSMU) type stereoscopic camera and a method of making stereoscopic video content, and more particularly to a stereoscopic camera and a method of making stereoscopic video content capable of providing stereoscopic video content that can be viewed on various sizes of 3D (three-dimensional) displays, such as cellular phones, display panels, personal computers, digital televisions, large movie screens, and so on, without eye fatigue.

BACKGROUND ART

A stereoscopic image may be generated by mixing left and right images having parallax. In the stereoscopic image displayed on a screen, an image having negative parallax appears to protrude out of the screen, and an image having positive parallax appears to be recessed into the screen in comparison with an image having zero parallax.

In reality, even though eye focus is adjusted to the screen, fusion processes of the eyes are varied according to parallaxes of images. Thus, the images may be perceived to be located in front of or behind the screen so that an observer may experience eye fatigue, dizziness, headaches, and so on when the parallax exceeds a fusion range. Moreover, the images may not seem to be natural or realistic, and the observer may see a double image in serious cases.

The parallax of the stereoscopic image is varied based on the separation between left and right cameras and the distance from a lens to an object.

The stereoscopic image has generally been made by a conventional stereoscopic camera in consideration of a single 3D display platform. Thus, stereoscopic images made for a large movie screen having a convergence distance over 10 m may not be suitable for small-size displays such as mobile handsets having a convergence distance under 30 cm. Conversely, stereoscopic images made for small-size displays cannot be displayed on a large movie screen having a long convergence distance. Because the stereoscopic images have been made as one source-one use type images, distribution of stereoscopic video content has been limited, and thus the various content business market has not been active.

Recently, the sizes of flat panel displays such as liquid crystal displays (LCDs) and plasma display panels (PDPs) have become larger. However, the parallax of an object having a large horizontal width may exceed a convergence limit when the display size becomes extremely wide, not only in normal 2D (two-dimensional) viewing conditions but also in stereoscopic imaging. In addition, the parallax may be easily distinguishable in the stereoscopic imaging, and thus the size of a display image has to be considered.

However, a one source multi use (OSMU) type stereoscopic image which is suitable for a small-size display of 2" to a large movie screen for a theater has not been made until now.

DISCLOSURE OF THE INVENTION

Technical Problem

The present invention provides a stereoscopic camera and a method of making stereoscopic video content solving the problems mentioned above. The present invention provides a stereoscopic camera providing stereoscopic images that provide a natural stereoscopic effect without eye fatigue regardless of viewing distance or screen size.

In addition, the present invention provides a method of making one source multi use (OSMU) type stereoscopic video content using the stereoscopic camera.

Technical Solution

To accomplish the goal mentioned above, a stereoscopic camera according to an example embodiment of the present invention includes left and right cameras, a separation adjustment unit, a critical parallax computing unit, a camera separation computing unit, an image storage unit. The left and right cameras are aligned to have parallel optical axes. The separation adjustment unit adjusts the separation between the left and right cameras. The critical parallax computing unit adjusts the focus of a stereoscopic camera to an object and determines the far point of an image, the focus of which has been adjusted to the object, so that a maximum critical parallax is computed based on a far point limit parallax of a medium-size stereoscopic display. The separation between optical axes in the stereoscopic camera is set to an arbitrary value. The camera separation computing unit computes the separation between the parallel optical axes based on the computed critical parallax and drives the separation adjustment unit in response to the computed separation. The image storage unit stores left and right images photographed by left and right cameras readjusted by the camera separation computing unit.

In OSMU-type stereoscopic video content, according to a method of making OSMU video content, the focus of a stereoscopic camera, of which parallel optical axes are set to an arbitrary value, is adjusted to an object. The far point of an image of which the focus has been adjusted to an object is determined. A maximum allowable critical parallax at the far point of the image based on a far point limit parallax of a medium-size stereoscopic display is computed. The separation between the parallel optical axes based on the computed critical parallax is readjusted. The object by the readjusted stereoscopic camera is photographed.

The medium-size stereoscopic display is preferably a desktop monitor having a size within a range of 17" to 24", which are among the most widespread types of monitors. A far point limit parallax of the medium-size stereoscopic display may be approximately 2.79% of an optimal viewing distance. 2.79% corresponds to a maximum angle of 1.6 degrees until which stereoscopic images may converge for ordinary people who have not been trained to view stereoscopic images.

A stereoscopic camera according to a second example embodiment of the present invention includes left and right cameras, a sensor separation adjustment unit, a critical parallax computing unit, a camera separation computing unit, and an image storage unit. The left and right cameras are aligned to have parallel optical axes. The sensor separation adjustment unit adjusts the separation between image sensors while the separation between the left and right cameras is fixed. The critical parallax computing unit adjusts the focus of a stereoscopic camera to an object and determines the far point of an image, the focus of which has been adjusted to the object, so that a maximum critical parallax is computed based on a far point limit parallax of a medium-size stereoscopic display. The separation between optical axes in the stereoscopic camera is set to an arbitrary value. The camera separation computing unit computes the separation between the parallel optical axes based on the computed critical parallax and drives the sensor separation adjustment unit in response to the computed separation. The image storage unit stores left and right images photographed by left and right cameras readjusted by the camera separation computing unit.

In OSMU-type stereoscopic video content, according to a second example embodiment of a method of making OSMU video content, the separation between the parallel optical axes of image sensors is set to an arbitrary value. The far point of an image of which the focus has been adjusted to the object is determined. A maximum allowable critical parallax at the far point of the image is computed based on a far point limit parallax of a medium-size stereoscopic display. The separation between the parallel optical axes is readjusted based on the computed critical parallax. The object is photographed by the readjusted stereoscopic camera.

An OSMU-type stereoscopic camera according to a third example embodiment of the present invention includes left and right cameras, a critical parallax computing unit, a camera separation computing unit, and an image storage unit. The left and right cameras include image sensors and wide lenses, each of the image sensors and wide lenses having a field of view (FOV) corresponding to a wide imaging area which is greater than a native imaging area. Parallel optical axes of the wide lenses are fixed. The critical parallax computing unit adjusts the focus of a stereoscopic camera with the fixed separation to an object and determines the far point of an image, the focus of which has been adjusted to the object, so that a maximum critical parallax is computed based on a far point limit parallax of a medium-size stereoscopic display. The camera separation computing unit computes the separation between the parallel optical axes based on the computed critical parallax. The image storage unit stores wide left and right images photographed by left and right cameras. During a read operation, the image storage unit outputs left and right display images in response to the separation computed by the camera separation computing unit.

In OSMU-type stereoscopic video content, according to a third example embodiment of a method of making OSMU video content, an object is photographed by a stereoscopic camera set to have a fixed separation. The stereoscopic camera includes image sensors and wide lenses, each of image sensors and wide lenses having the FOV corresponding to the wide imaging area which is greater than the native imaging area. The photographed left and right images having wide imaging areas are stored. The far point of an image of which the focus has been adjusted to the object is determined. A maximum allowable critical parallax at the far point of the image is computed based on a far point limit parallax of a medium-size stereoscopic display. Display image read addresses from the stored wide imaging area images are reset in response to the computed separation based on the computed critical parallax. Left and right display images are read in response to the reset read addresses.

An OSMU-type stereoscopic camera according to a fourth example embodiment includes left and right cameras, a critical parallax computing unit, a camera separation computing unit, and an image storage unit. The left and right cameras include image sensors and wide lenses, each of image sensors and wide lenses having the FOV corresponding to the wide imaging area which is greater than the native imaging area. The wide imaging area is greater than a display image size and optical axes of the wide lenses are set to have a fixed separation. The critical parallax computing unit adjusts the focus of the stereoscopic camera set to have the fixed separation to an object and determines the far point of an image of which the focus has been adjusted to the object. Therefore, the critical parallax computing unit computes a maximum critical parallax based on a far point limit parallax of a medium-size stereoscopic display. The camera separation computing unit computes the separation between the parallel optical axes based on the computed critical parallax. The image storage unit writes wide-area left and right images picked up by the left and right cameras. During a read operation, the image storage unit outputs left and right display images in response to the separation value computed by the camera separation unit.

In OSMU-type stereoscopic video content, according to a fourth example embodiment of a method of making OSMU video content, an object is photographed by a stereoscopic camera set to have a fixed separation between cameras. The stereoscopic camera includes image sensors and wide lenses, each of image sensors and wide lenses having the FOV corresponding to the wide imaging area which is greater than the native imaging area. The far point of an image of which the focus has been adjusted to the object is determined and a maximum critical parallax at the far point of the image is computed based on a far point limit parallax of a medium-size stereoscopic display so that the separation between the cameras are computed based on the computed critical parallax. Display-size left and right images are stored among the wide area images in response to the computed separation between the cameras.

An OSMU-type stereoscopic camera according to a fifth example embodiment includes left and right cameras, a critical parallax computing unit, a camera separation computing unit, and an image storage unit. The left and right cameras include image sensors and wide lenses, each of image sensors and wide lenses having the FOV corresponding to the wide imaging area which is greater than the native imaging area. The wide imaging area is greater than a display image size and optical axes of the wide lenses being fixed parallel to each other. The critical parallax computing unit adjusts the focus of the stereoscopic camera set to have the fixed separation to an object and determines the far point of an image of which the focus has been adjusted to the object. Therefore, the critical parallax computing unit computes a maximum critical parallax based on a far point limit parallax of a medium-size stereoscopic display. The camera separation computing unit computes the separation between the parallel optical axes based on the computed critical parallax. The image storage unit stores wide-area left and right images picked up by the left and right cameras. The image sensors of the left and right cameras only output pixel data having a display size in response to the separation between the cameras computed.

In OSMU-type stereoscopic video content, according to a fifth example embodiment of a method of making OSMU video content, an object is photographed by a stereoscopic camera set to have a fixed separation between cameras. The stereoscopic camera includes image sensors and wide lenses, each of image sensors and wide lenses having the FOV corresponding to the wide imaging area which is greater than the native imaging area. The far point of an image of which the focus has been adjusted to the photographed object is determined. A maximum allowable critical parallax is computed based on a far point limit parallax of a medium-size stereoscopic display. The separation between cameras is computed based on the computed critical parallax. Only pixel data having a display size is output from the image sensors and stored.

Advantageous Effects

A desktop monitor may be the most widespread type of display among the small-size mobile handsets to the large movie screen. As described above, the stereoscopic camera according to the present invention readjusts a camera separation of the stereoscopic camera based on a far point parallax of the desktop monitor. Thereafter, the stereoscopic camera may make OSMU-type stereoscopic video content by taking stereoscopic images.

Hereinafter, embodiments according to the present invention will be described more fully with reference to the accompanying drawings. These embodiments are provided so that this disclosure will be thorough and complete, and will fully convey the scope of the invention to those skilled in the art.

BEST MODE FOR CARRYING OUT THE INVENTION

Figure 1:
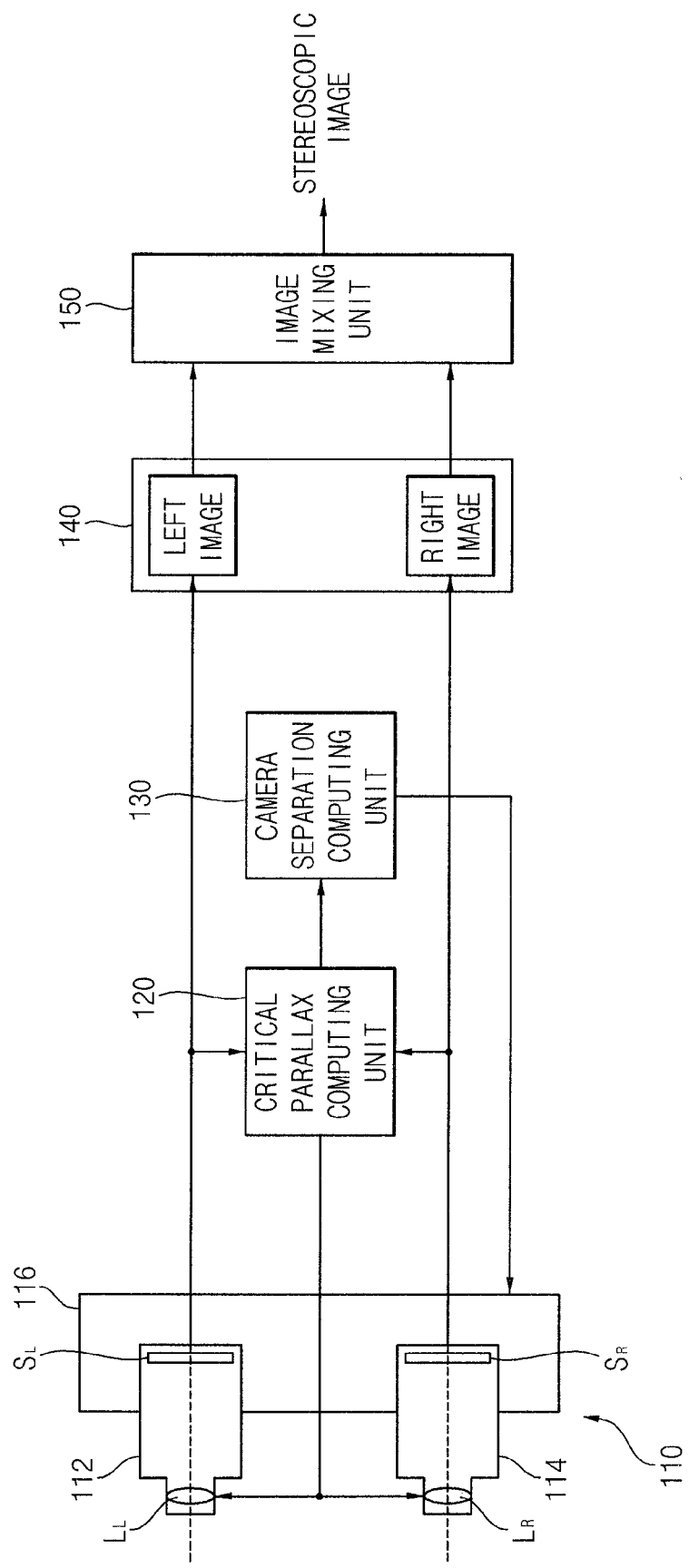
FIG. 1 is a block diagram illustrating a one source multi use (OSMU) type stereoscopic camera according to an example embodiment of the present invention.

FIG. 1 is a block diagram illustrating a one source multi use (OSMU) type stereoscopic camera according to a first example embodiment of the present invention. Referring to FIG. 1, a stereoscopic camera 100 may include a camera unit 110, a critical parallax computing unit 120, a camera separation computing unit 130, an image storage unit 140, and an image mixing unit 150.

The camera unit 110 may include a left camera 112, a right camera 114, and a separation adjustment unit 116. The left and right cameras 112 and 114 are aligned parallel with each other on the separation adjustment unit 116. The left and right cameras 112 and 114 move in a direction perpendicular to optical axes, that is, left and right directions, and thus the separation between the left and right cameras 112 and 114 may be varied. The left camera 112 may include a lens $L_L$ and an image sensor $S_L$ arranged on a common optical axis. The right camera 112 may include a lens $L_R$ and an image sensor $S_R$ arranged on a common optical axis. The image sensors $S_L$ and $S_R$ may be charge-coupled device (CCD) image sensors or complimentary metal oxide semiconductor (CMOS) image sensors.

The critical parallax computing unit 120 adjusts the focus of a stereoscopic camera, of which the separation between the parallel optical axes is the set to an arbitrary value, to an object. The critical parallax computing unit 120 determines the far point of an image and computes a critical parallax based on a far point limit parallax of a stereoscopic display having medium size.

Figure 2:
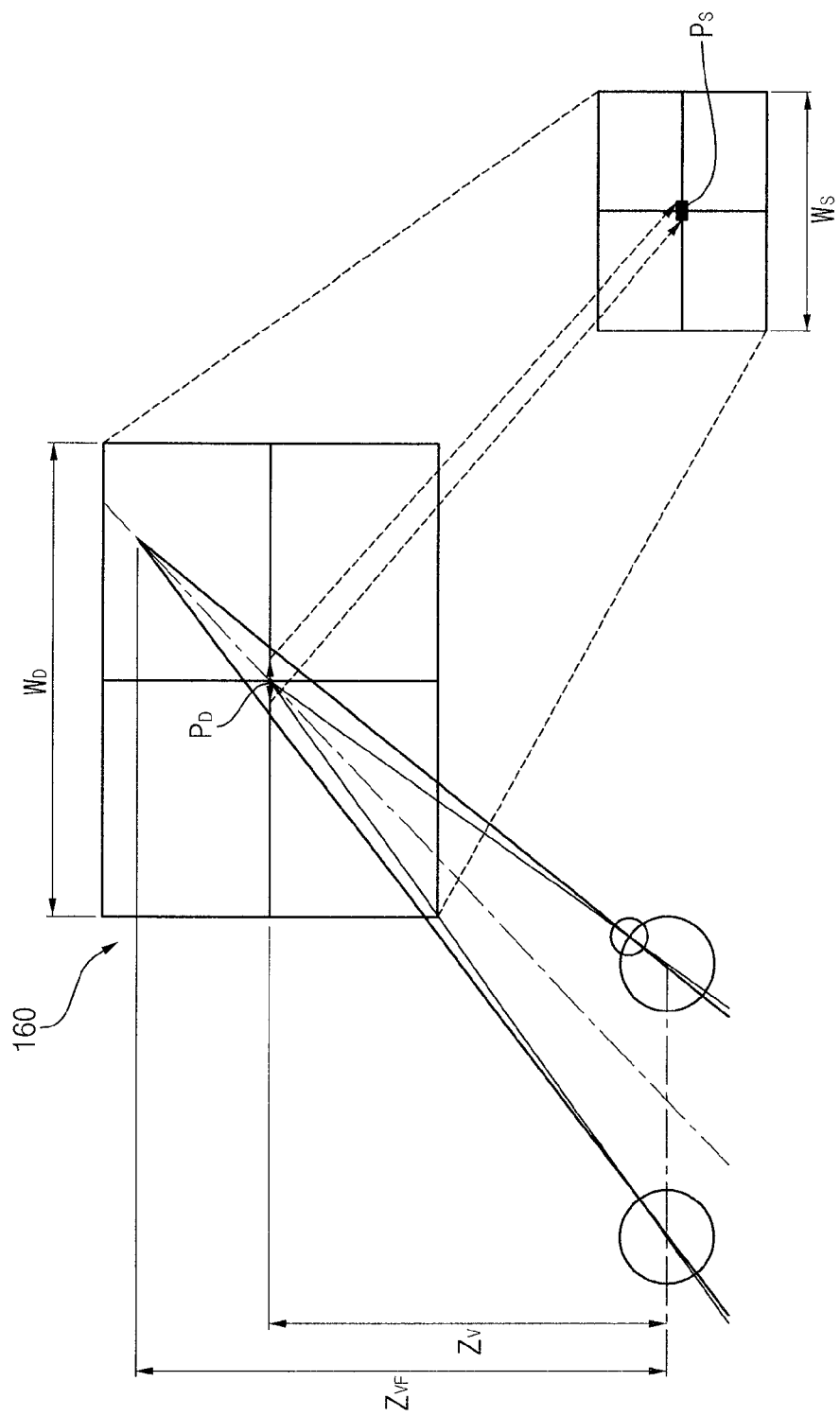
FIG. 2 is a diagram for describing a relation between a far point limit parallax of a stereoscopic display and a critical parallax of a stereoscopic camera.

FIG. 2 is a diagram illustrating a relation between a far point limit parallax of a stereoscopic display and a critical parallax of a stereoscopic camera.

Referring to FIG. 2, a far point limit parallax $P_D$ of a screen of the stereoscopic display based on a tan (1.6) value of a convergence distance $Z_V$. An ordinary person who has not been trained for viewing stereoscopic images may generally perceive images having parallax to a maximum angle of 1.6 degrees, which is half of a maximum value of retinal disparity obtained from an actual screen. Thus, eye fatigue symptoms and headaches may be reduced when a screen parallax is limited to half of the retinal disparity.

TABLE 1 represents a limit parallax according to a convergence distance.

TABLE 1

Far point limit parallax of stereoscopic display

| View Mode | Convergence Distance (m) | Far Point Limit Parallax ($P_D$) | Remarks |
|---|---|---|---|
| Small-size (2"-10") mobile handset | 0.25 | 0.0070 | Cellular phone, PDA, DMB, navigation |
| | 0.30 | 0.0084 | |
| Small and medium-size (15"-24") desktop monitor | 0.40 | 0.0112 | Maintain at least 45 cm distance or more |
| | 0.46 | 0.0128 | |
| | 0.50 | 0.0140 | |
| Medium-size (30"-50") digital television (SD, HD, Full-HD) | 0.60 | 0.0167 | When a resolution increases, a viewing distance decreases |
| | 0.70 | 0.0195 | |
| | 1.00 | 0.0279 | SD level: about 3 m |
| | 2.00 | 0.0558 | Full-HD level: about 1.6 m |
| Medium-and large-size (60"-100") projection screen | 3.00 | 0.0837 | |
| | 4.00 | 0.1116 | |
| | 5.00 | 0.1395 | |
| Large (100" or more) movie screen | 7.00 | 0.1953 | |
| | 10.00 | 0.2790 | |

In order to view one source of stereoscopic image content in all sizes of stereoscopic displays, the far point limit parallax based on the medium-size display, such as a desktop monitor having a size within a range of 17" to 24".

The medium-size desktop monitor may have a shortest convergence distance according to a display size as represented in TABLE 2. Therefore, the medium-size desktop monitor may be under the most unfavorable conditions because of the greatest field of view (FOV).

TABLE 2

FOV according to display size

| Horizontal Width | Horizontal Width/2 | Convergence Distance | a/b | θ/2 | FOV |
|---|---|---|---|---|---|
| 44.16 (2.2") | 22.08 | 300 | 0.0736 | 4.21 | 8.42 |
| 88 (4") | 44 | 300 | 0.1466 | 8.34 | 16.68 |
| 162 (8") | 81 | 300 | 0.2700 | 15.11 | 30.22 |
| 376 (19") | 188 | 460 | 0.4087 | 22.23 | 44.46 |
| 518.4 (24") | 259.2 | 500 | 0.5184 | 27.4 | 54.8 |
| 2220 (100") | 1110 | 3000 | 0.37 | 20.3 | 40.3 |
| 6640 (300") | 3320 | 10000 | 0.332 | 18.37 | 36.74 |

With reference to TABLE 2, a standard convergence distance is 46 cm when using a 19" display. The far point limit parallax ($P_D$) may be derived from Equation 1.

$$P_D = 0.46\,m \times 0.0279 = 0.0128\,m \quad \text{[Equation 1]}$$

When the standard convergence distance is 50 cm, the far point limit parallax is derived as 0.0140 m in a 24" display.

An allowable critical parallax, that is, a critical parallax under unfavorable display watching conditions, may be derived from Equation 2.

$$P_S = P_D \times (W_S / W_D) \quad \text{[Equation 2]}$$

In Equation 2, $P_s$ denotes a critical parallax at the far point of an image sensor, $W_s$ denotes the horizontal width of the image sensor, $P_D$ denotes a far point limit parallax of the medium-size display, and $W_D$ denotes the horizontal width of the display.

For example, a critical parallax at the far point of the image sensor $P_S$ is 0.0128 m×(0.0088 m/0.378 m)=0.298 mm by Equation 2 when a horizontal width $W_D$ of 19" monitor is 0.378 m and a horizontal width $W_s$ of 2/3" CCD image sensor is 0.0088 m.

The camera separation computing unit 130 computes the separation between the parallel optical axes based on the computed critical parallax $P_s$ and drives a separation adjustment unit 160 in response to the computed separation to adjust the separation between the left and right cameras $C_c$.

$$C_C = P_S / Z_s (1/Z_0 - 1/Z_F) \quad \text{[Equation 3]}$$

According to Equation 3, the critical parallax $P_s$ under the unfavorable watching conditions may be characterized to adjust a camera separation so that the OSMU condition may be satisfied.

Figure 3:
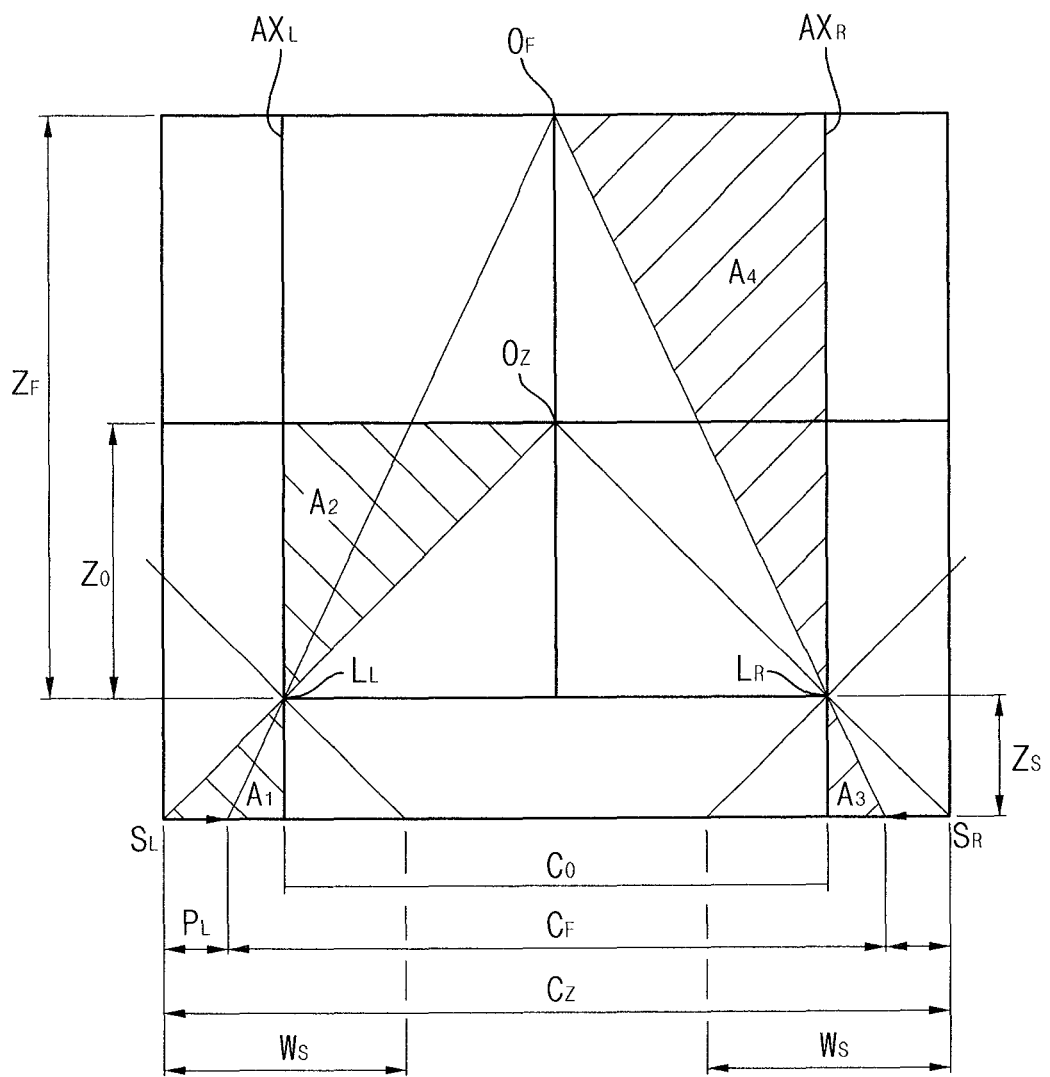
FIG. 3 illustrates optical geometry between left and right cameras and an object.

FIG. 3 is a diagram illustrating an optical geometry between the left and right cameras 112 and 114 in the camera unit 110 and the object.

Each symbol in FIG. 3 denotes:

$AX_L$: optical axis of a left lens
$AX_R$: optical axis of a right lens
$Z_0$: distance in a straight line between the center of a lens and a convergence point $O_Z$ (zero parallax distance)
$Z_F$: distance in a straight line between the center of a lens and the far point of (critical parallax distance)
$Z_S$: distance in a straight line between the center of a lens and the image sensors $S_L$ and $S_R$ (image distance)
f: focal length of the lens
$C_C$: distance between the centers of the left and right lenses $L_L$ and $L_R$ (separation between the left and right cameras)
$C_Z$: distance between the centers of the left and right image sensors $S_L$ and $S_R$ (separation between the centers of left and right zero parallax images)
$C_F$: distance between the centers of far point left and right images photographed by the image sensors $S_L$ and $S_R$ (separation between the centers of left and right far point limit parallax images)
$W_S$: horizontal width between the image sensors $S_F$ and $S_R$
$P_L$: left parallax
$P_R$: right parallax In similar triangles $A_1$ and $A_2$, $Z_0:C_0/2 = Z_S:(C_Z-C_0)/2$ is derived by Equation 3, and thus Equation 4 is represented as follows.

$$C_Z = (Z_S/Z_0)C_c + C_c \quad \text{[Equation 4]}$$

In the same way, $Z_F:C_c/2 = Z_S:(C_F-C_c)/2$ is derived in similar triangles $A_3$ and $A_4$, and thus Equation 5 is represented as follows.

$$C_F = (Z_S/Z_F)C_c + C_c \quad \text{[Equation 5]}$$

Parallax between the left and right images corresponding to the far point is represented by Equation 6.

$$\begin{aligned}P_F &= P_L + P_R \\ &= C_Z - C_F \\ &= (Z_S/Z_0)C_c + C_c - \{(Z_S/Z_F)C_c + C_c\} \\ &= Z_S C_c(1/Z_0 - 1/Z_F)\end{aligned} \quad \text{[Equation 6]}$$

Therefore, Equation 3 may be derived by solving Equation 6.

The image storage unit 140 stores the respective left and right images photographed by the stereoscopic camera of which the separation between the cameras is readjusted based on Equation 3.

The image mixing unit 150 respectively shifts the left and right images stored in the image storage unit 140 in the left and right directions so that zero parallaxes of the images converge by overlapping. Thereafter, the image mixing unit 150 mixes the overlapped image with the stereoscopic image having parallax. The mixed stereoscopic image is shown on a stereoscopic display.

Figure 4:
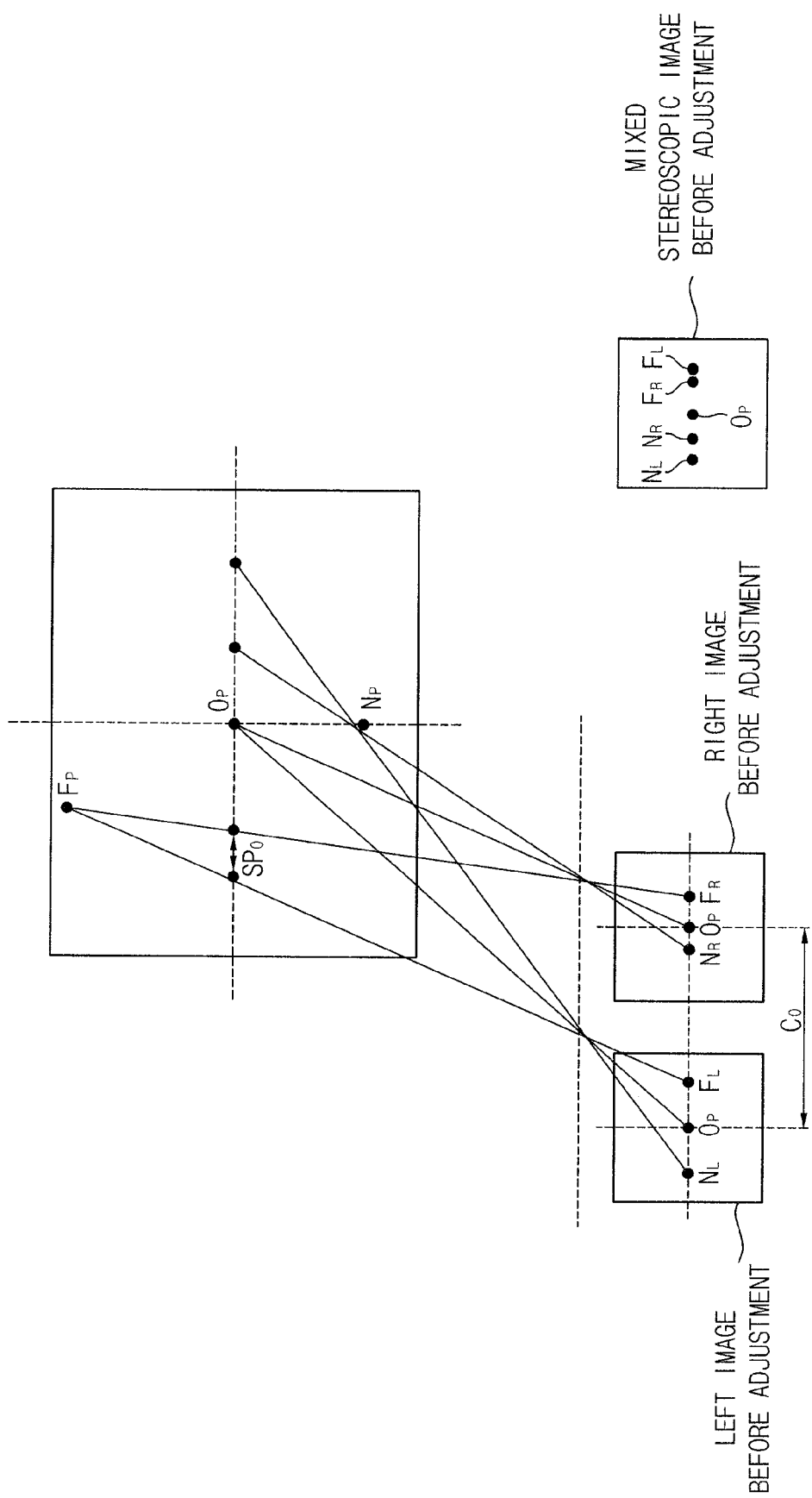
FIG. 4 illustrates a geometry structure of left and right images photographed by image sensors and a mixed stereoscopic image on condition that the separation between cameras is an initial state.
Figure 5:
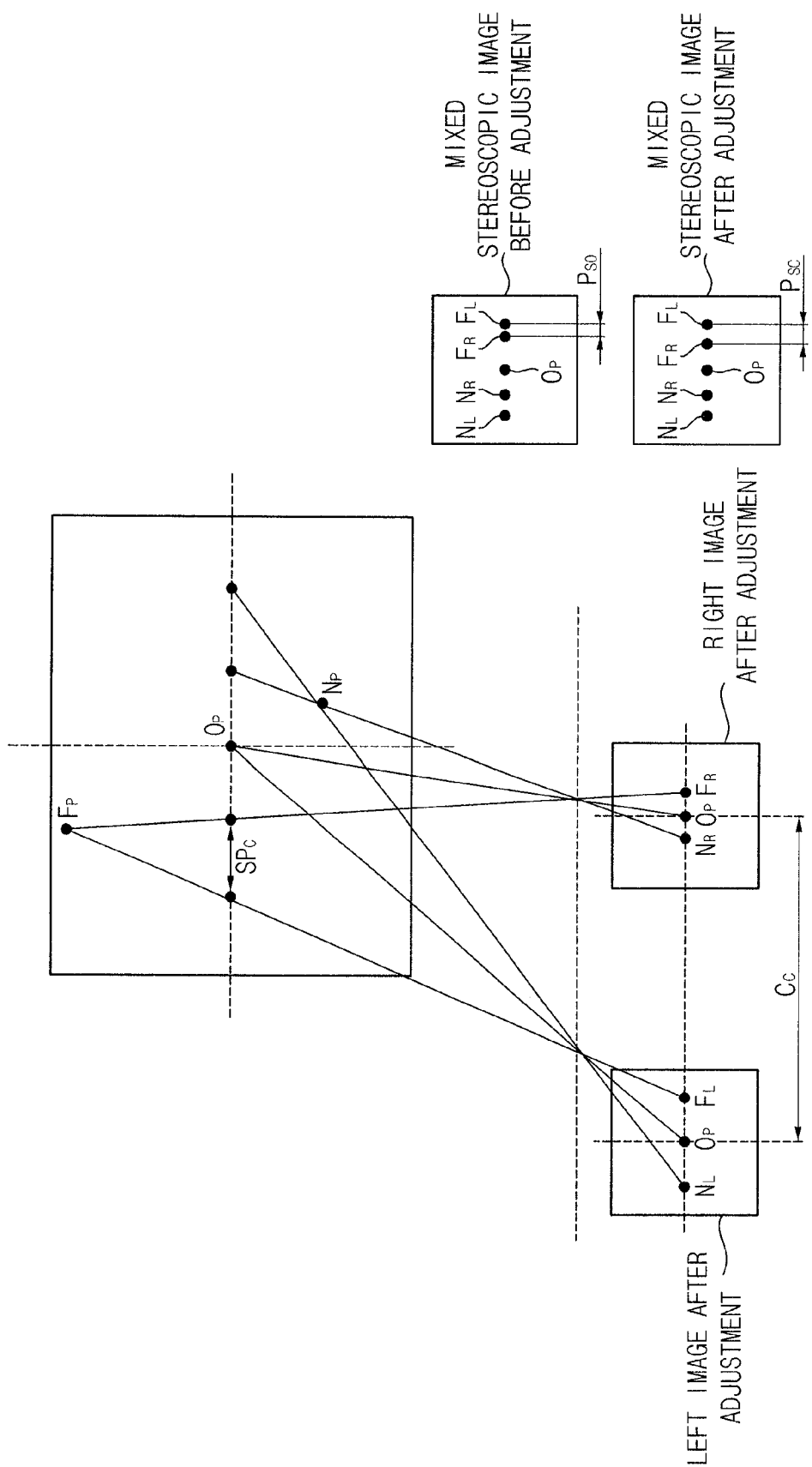
FIG. 5 illustrates a geometry structure of left and right images photographed by image sensors and a mixed stereoscopic image on condition that the separation between cameras is readjusted.

FIG. 4 illustrates a geometry structure of left and right images photographed by image sensors and a mixed stereoscopic image on condition that the separation between cameras is an initial state. FIG. 5 illustrates a geometry structure of left and right images photographed by image sensors and a mixed stereoscopic image on condition that the separation between cameras is readjusted according to the present invention.

Referring to FIGS. 4 and 5, the separation between cameras is readjusted from $C_0$ to $C_C$ so that an initial far point screen parallax $SP_O$ becomes a critical screen parallax $SP_C$ corresponding to a critical parallax of the stereoscopic display. Therefore, the parallax of the left and right far point images $F_L$ and $F_R$ is readjusted from the initial far point screen parallax $PS_O$ to the critical screen parallax $PS_C$.

Figure 6:
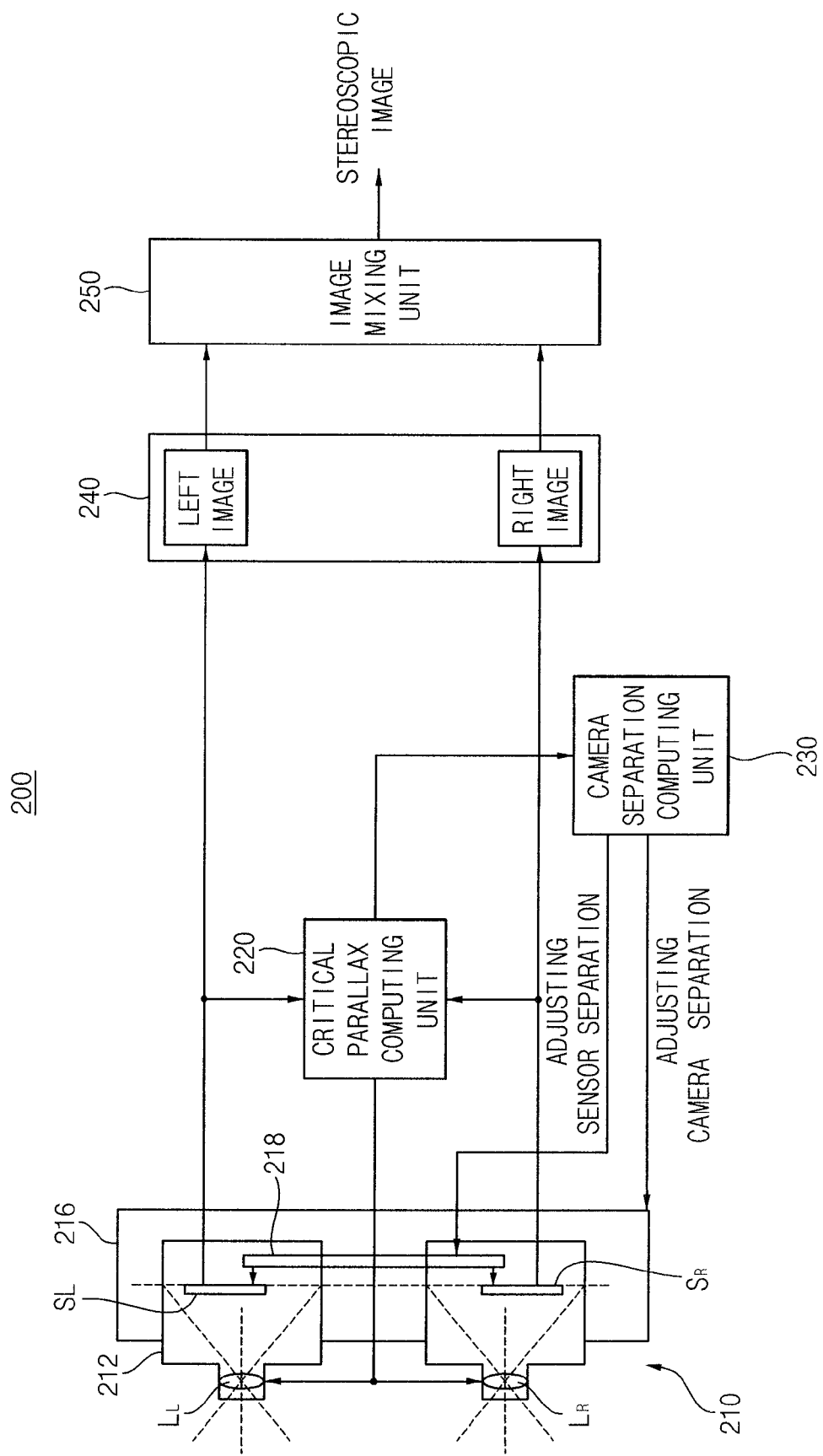
FIG. 6 is a block diagram illustrating an OSMU-type stereoscopic camera according to another example embodiment of the present invention.

FIG. 6 is a block diagram illustrating an OSMU-type stereoscopic camera according to a second example embodiment of the present invention. The OSMU-type stereoscopic camera according to the second example embodiment independently adjusts separations between lenses and image sensors of a camera unit in compare with the OSMU-type stereoscopic camera according to the first example embodiment.

Referring to FIG. 6, a stereoscopic camera 200 may include a camera unit 210, a critical parallax computing unit 220, a camera separation computing unit 230, an image storage unit 240, and an image mixing unit 250.

The camera unit 210 may include a left camera 212, a right camera 214, a camera separation adjustment unit 216, and a sensor separation adjustment unit 218. The left and right cameras 212 and 214 are aligned parallel with each other on the camera separation adjustment unit 216. The left and right cameras 212 and 214 may move in the directions perpendicular to optical axes, that is, left and right directions so that the separation between the left and right cameras 212 and 214 may be adjusted. The right camera 212 may include an image sensor $S_L$ which may move in the directions perpendicular to the optical axis of a lens $L_L$. The left camera 214 may include an image sensor $S_R$ which may move in the directions perpendicular to the optical axis of a lens $L_R$. The left and right image sensors $S_L$ and $S_R$ are aligned parallel with each other on the sensor separation adjustment unit 218 so that the separation between the left and right image sensors $S_L$ and $S_R$ are adjusted with each other.

The critical parallax computing unit 220 adjusts the focus of the stereoscopic camera to an object and determines the far point of an image, of which the focus has been adjusted to the object, to compute a maximum allowable critical parallax at the far point of the image based on a far point limit parallax of the medium-size stereoscopic display. The separation between the image sensors $S_L$ and $S_R$ is set to an arbitrary value.

The camera separation computing unit 230 computes the separation between the image sensors $S_L$ and $S_R$ based on the computed critical parallax and drives the sensor separation adjustment unit 218 in response to the computed separation. The camera separation computing unit 230 may adjust the separation between the lenses by driving the camera separation adjustment unit 216.

The image storage unit 240 respectively stores left and right images photographed by the stereoscopic camera of which the separation is readjusted based on Equation 3.

The image mixing unit 250 respectively shifts the left and right images stored in the image storage unit 240 so that zero parallaxes of the images converge by overlapping. The image mixing unit 250 mixes the overlapped images with the stereoscopic image having the parallax. The mixed stereoscopic image is shown on the stereoscopic display.

In the second example embodiment, the separation between the left and right image sensors $S_L$ and $S_R$ aligned with parallel optical axes is set to an arbitrary value. The focus of the stereoscopic camera including the left and right image sensors $S_L$ and $S_R$ is adjusted to the object so that the far point of the image, of which the focus has been adjusted to the object, is determined. Thereafter, a maximum allowable critical parallax at the far point of the image is computed based on the far point limit parallax of the medium-size stereoscopic display. The separation between the left and right image sensors $S_L$ and $S_R$ is readjusted based on the computed critical parallax. The stereoscopic camera with the readjusted image sensors photographs the object so that OSMU-type stereoscopic video content may be made.

Figure 7:
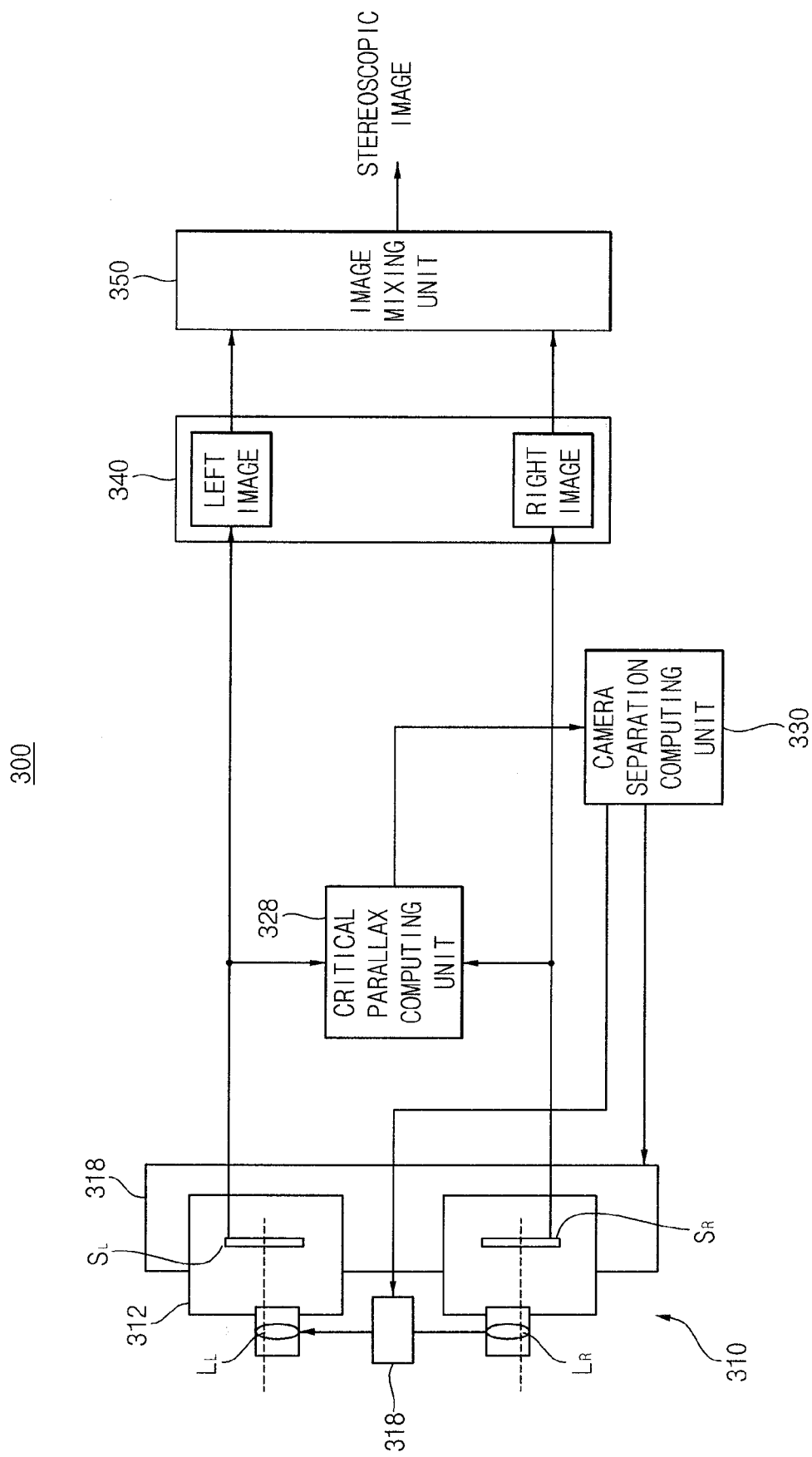
FIG. 7 is a block diagram illustrating an OSMU-type stereoscopic camera according to a modified example embodiment.

FIG. 7 is a block diagram illustrating an OSMU-type stereoscopic camera according to a modified example embodiment. Compared to the second example embodiment, image sensors are fixed and lenses move in the left and right directions with reference to FIG. 7.

Referring to FIG. 7, a stereoscopic camera 300 may include a camera unit 310, a critical parallax computing unit 320, a camera separation computing unit 330, an image storage unit 340, and an image mixing unit 350.

The camera unit 310 may include a left camera 312, a right camera 314, a camera separation adjustment unit 316, and a lens separation adjustment unit 318. The left and right cameras 312 and 314 are aligned parallel with each other on the camera separation adjustment unit 316 and able to move in perpendicular to optical axes, that is, the left and right directions so that the separation between the left and right cameras 312 and 314 may be adjusted. The left camera 312 may include a lens $L_L$ which may move to the left and right in the directions perpendicular to the optical axis of the image sensor $S_L$. The right camera 312 may include a lens $L_R$ which may move to the left and right in the directions perpendicular to the optical axis of the image sensor $S_R$. The left and right lenses $L_L$ and $L_R$ are aligned parallel with each other on the lens separation adjustment unit 318 so that the separation between the left and right lenses $L_L$ and $L_R$ may be adjusted with respect to each other.

The critical parallax computing unit 320 adjusts the focus of the stereoscopic camera, of which the lenses $L_L$ and $L_R$ have been set to an arbitrary value, to an object. The critical parallax computing unit 320 determines the far point of an image of which the focus has been adjusted to the object. Therefore, the critical parallax computing unit 320 may compute a maximum allowable critical parallax at the far point of the image based on a far point limit parallax of the medium-size stereoscopic display.

The camera separation computing unit 330 computes the separation between the lenses $L_L$ and $L_R$ based on the computed critical parallax and drives the lens separation adjustment unit 318 in response to the computed separation. The camera separation computing unit 330 may adjust the separation between the sensors $S_L$ and $S_R$ by driving the camera separation adjustment unit 316.

The image storage unit 340 stores left and right images photographed by the stereoscopic camera of which the separation between the cameras has been readjusted based on Equation 3.

The image mixing unit 350 respectively shifts the left image and right images stored in the image storage unit 340 in the left and right directions such that zero parallaxes of the images converge by overlapping. Thereafter, the image mixing unit 350 mixes the overlapped images with the stereoscopic image having parallax. The mixed stereoscopic image is shown on a stereoscopic display.

In the modified example embodiment, the separation between the left and right lenses $L_L$ and $L_R$ aligned with parallel optical axes is set to an arbitrary value. The stereoscopic camera including the left and right lenses $L_L$ and $L_R$ adjusts the focus to the object and determines the far point of the image of which the focus has been adjusted to the object. Thereafter, the maximum allowable critical parallax at the far point of the image is computed based on the far point limit parallax of the medium-size stereoscopic display. The separation between the left and right lenses $L_L$ and $L_R$ is readjusted based on the computed critical parallax. The stereoscopic camera with the readjusted lenses photographs the object so that OSMU-type stereoscopic video content may be made.

Figure 8:
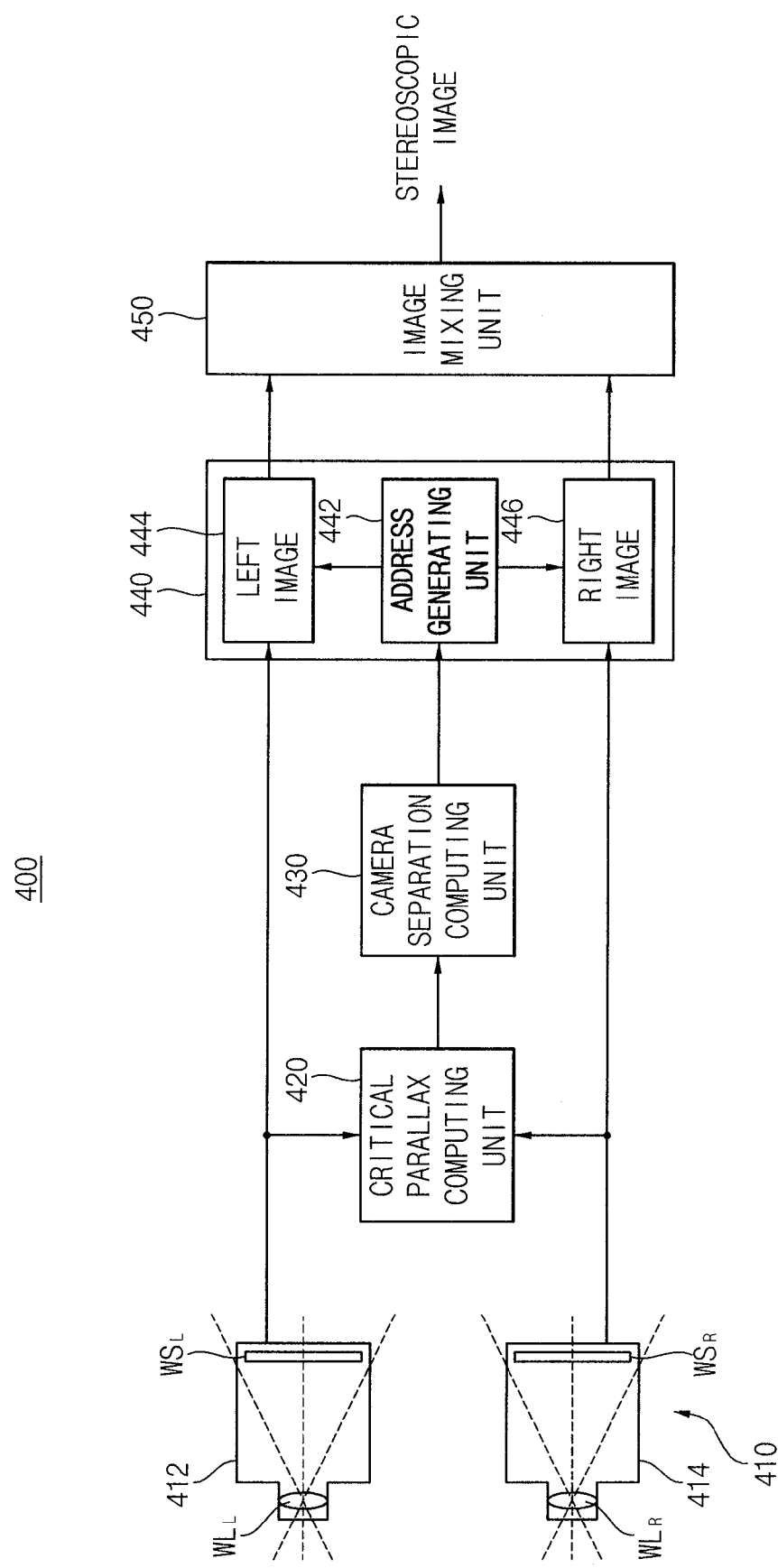
FIG. 8 is a block diagram illustrating still another example embodiment of the OSMU-type stereoscopic camera.

FIG. 8 is a block diagram illustrating a third example embodiment of the OSMU-type stereoscopic camera.

The stereoscopic camera 400 may include a camera unit 410, a critical parallax computing unit 420, a camera separation computing unit 430, an image storage unit 440, and an image mixing unit 450.

Figure 9:
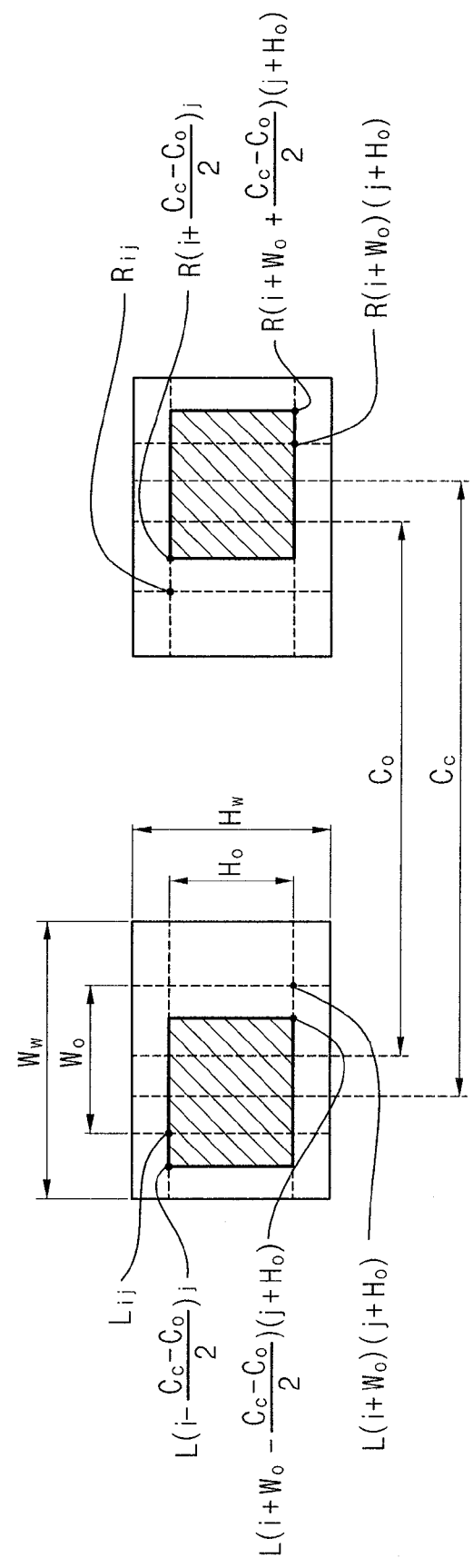
FIG. 9 is a diagram for describing an example of FIG. 8.

The camera unit 410 may include a left camera 412 and a right camera 414. The left and right cameras 412 and 414 are aligned parallel with each other. The left and right cameras 412 and 414 respectively include left and right wide image sensors $WS_L$ and $WS_R$ and left and right wide lenses $WL_L$ and $WL_R$. The sizes of the left and right wide image sensors $WS_L$ and $WS_R$ and left and right wide lenses $WL_L$ and $WL_R$ are greater than the above-mentioned left and right image sensors $S_L$ and $S_R$ and lenses $L_L$ and $L_R$ such that the sizes of the left and right wide image sensors $WS_L$ and $WS_R$ and left and right wide lenses $WL_L$ and $WL_R$ may include maximum allowable moving distances of the left and right image sensors $S_L$ and $S_R$ and lenses $L_L$ and $L_R$. Referring to FIG. 9, the left and right wide image sensors $WS_L$ and $WS_R$ may have a wide FOV which corresponds to a wide imaging area $W_W \times H_W$. The wide imaging area $W_W \times H_W$ is greater than a display imaging area $W_O \times H_O$. The display imaging area $W_O \times H_O$ may corresponds to a native imaging area.

The critical parallax computing unit 420 adjusts the focus of the stereoscopic camera which has a fixed separation between the left and right cameras and determines the far point of an image of which the focus has been adjusted to an object. The critical parallax computing unit 420 computes a maximum allowable critical parallax at the far point of the image based on a far point limit parallax of the medium-size stereoscopic display.

The camera separation computing unit 430 computes the separation between virtual cameras based on the computed critical parallax.

The image storage unit 440 may include an address generating unit 442, a left image storage unit 444, and a right image storage unit 446. The left and right image storage units 444 and 446 may have large storage capacities such that the left and right image storage units 444 and 446 may store the wide imaging area $W_W \times H_W$ corresponding to the size of the wide image sensors $WS_L$ and $WS_R$. The address generating unit 442 generates write addresses to respectively store left and right images photographed by the stereoscopic camera as the size of the wide imaging area $W_W \times H_W$ in the left and right image storage unit 444 and 446 as the originally photographed size. When the address generating unit 442 reads the stored image data from the left and right image storage units 444 and 446, the address generating unit 442 respectively generates left and right image read addresses ($L_{(i-(CC-CO)/2)j}$, $L_{(i+WO-(CC-CO)/2)(j+HO)}$) and ($R_{(j+(CC-CO)/2)j}$, $R_{(i+WO+(CC-CO)/2)(j+HO)}$) by shifting to left and right directions as much as the readjusted separation $C_c$ between the cameras in response to the separation which is computed by the camera separation computing unit 430. Therefore, a shaded portion in FIG. 9 is read as the read image data.

The image mixing unit 450 respectively shifts the left and right images read from the image storage unit 430 to the left and right directions so that zero parallaxes of the left and right images converge by overlapping. The overlapped image is mixed with the stereoscopic image having the parallax and the mixed stereoscopic image is shown on the stereoscopic display.

Figure 10:
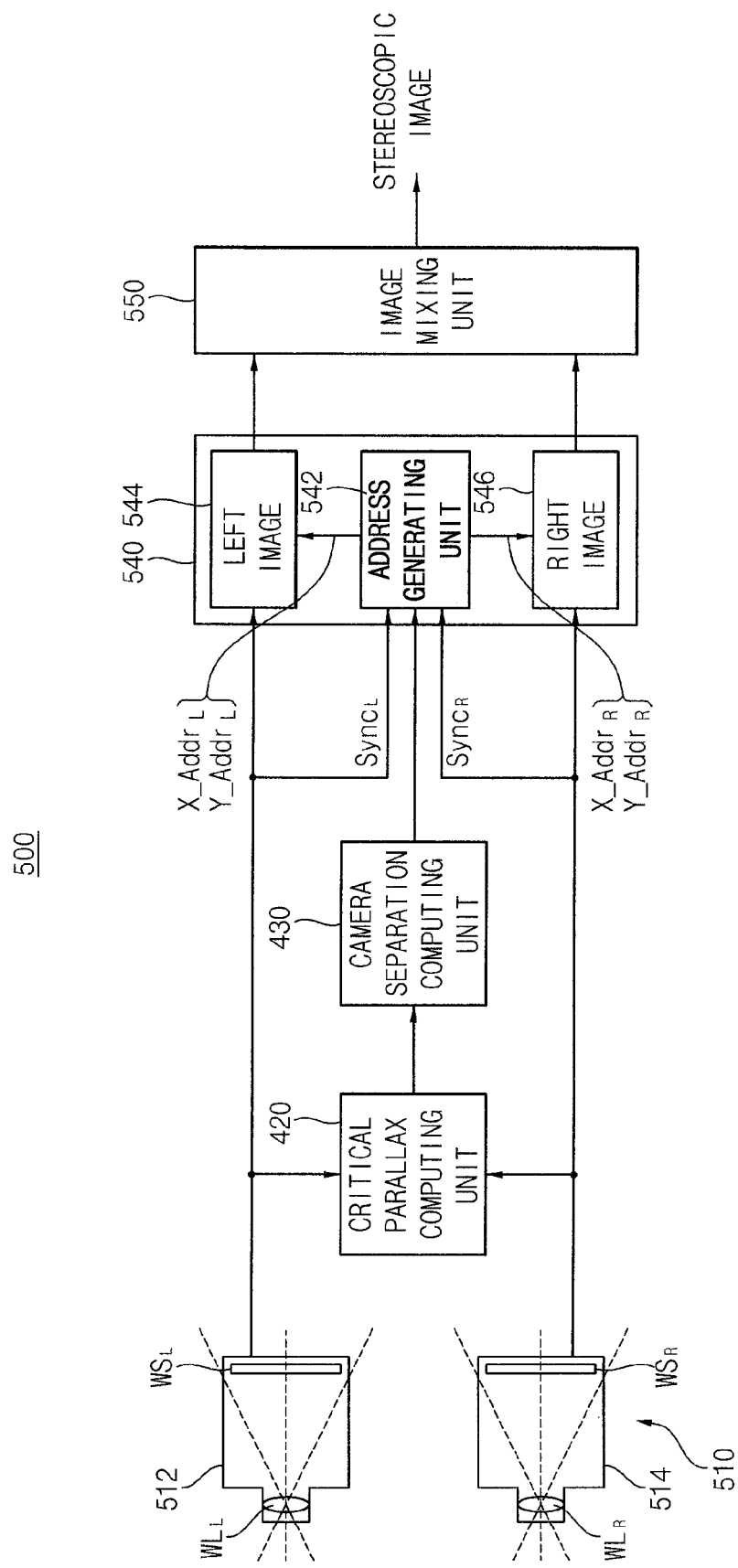
FIG. 10 is a block diagram illustrating a fourth example embodiment of the OSMU-type stereoscopic camera.
Figure 11:
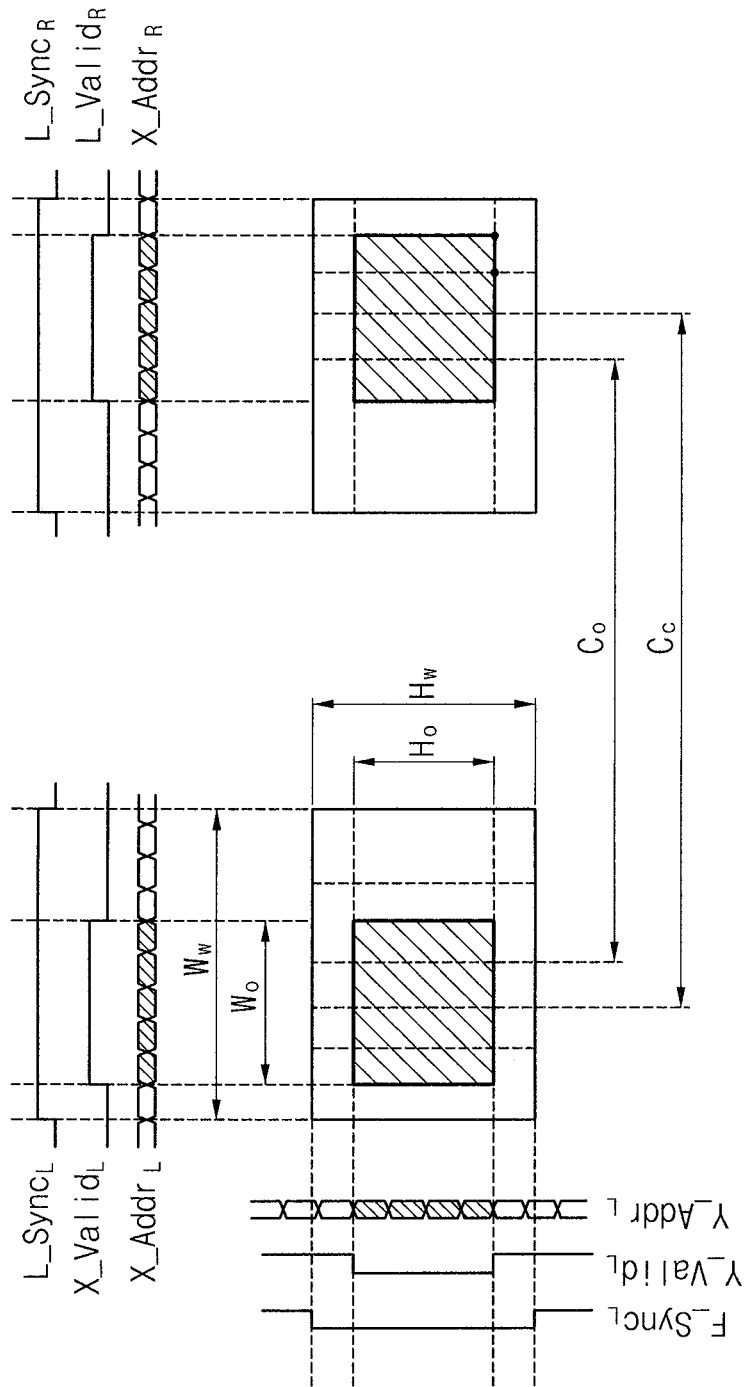
FIG. 11 is a diagram for describing an address generating operation of the address generating unit in FIG. 10.

FIG. 10 is a block diagram illustrating a fourth example embodiment of the OSMU-type stereoscopic camera and FIG. 11 is a diagram for describing an address generating operation of the address generating unit in FIG. 10.

Comparing with the third example embodiment, the fourth example embodiment of FIG. 10 readjusts not the read addresses but the write addresses in response to the separation between cameras. A stereoscopic camera 500 of the fourth example embodiment may include a camera unit 510, a critical parallax computing unit 520, a camera separation computing unit 530, an image storage unit 540, and an image mixing unit 550.

The camera unit 510 may include left and right cameras 512 and 514. The left and right cameras 512 and 514 are aligned parallel with each other in fixed locations. The left and right cameras 512 and 514 respectively include left and right wide image sensors $WS_L$ and $WS_R$ and left and right wide lenses $WL_L$ and $WL_R$. The sizes of the left and right wide image sensors $WS_L$ and $WS_R$ and left and right wide lenses $WL_L$ and $WL_R$ are greater than the above-mentioned left and right image sensors $S_L$ and $S_R$ and lenses $L_L$ and $L_R$ in the first and second example embodiments such that the sizes of the left and right wide image sensors $WS_L$ and $WS_R$ and left and right wide lenses $WL_L$ and $WL_R$ may include the maximum allowable moving distance of the left and right image sensors $S_L$ and $S_R$ and lenses $L_L$ and $L_R$. Referring to FIG. 11, the left and right wide image sensors $WS_L$ and $WS_R$ may have the wide FOV corresponding to the wide imaging area $W_W \times H_W$ which is greater than the display imaging area $W_O \times H_O$.

The critical parallax computing unit 520 adjusts the focus of a stereoscopic camera including fixed cameras to an object and determines the far point of an image of which the focus has been adjusted to the object. The critical parallax computing unit 520 computes a maximum allowable critical parallax at the far point of the image based on a far point limit parallax of the medium-size stereoscopic display.

The camera separation computing unit 530 computes the separation between virtual cameras based on the computed critical parallax.

The image storage unit 540 may include an address generating unit 542, a left image storage unit 544, and a right image storage unit 546. The left and right image storage units 544 and 546 may have large storage capacities such as the wide imaging area $W_W \times H_W$ corresponding to the size of the wide image sensors $WS_L$ and $WS_R$ may be storable.

The address generating unit 542 receives left and right sync signals $Sync_L$($L\_Sync_L$, $F\_Sync_L$) and $Sync_R$($L\_Sync_R$, $F\_Sync_R$) from the left and right image sensors $WS_L$ and $WS_R$. The address generating unit 542 generates X address valid signals $X\_Valid_L$ and $X\_Valid_R$ and Y address valid signals $Y\_Valid_L$ and $Y\_Valid_R$ in response to the readjusted separation between cameras $C_C$ computed by the camera separation computing unit 530 with reference to FIG. 11. The address generating unit 542 generates signals which are in a valid region (a shaded region) of Y addresses $Y\_Addr_L$ and $Y\_Addr_R$ and X addresses $X\_Addr_L$ and $X\_Addr_R$ stored in the image storage unit 540 as valid addresses in response to the generated X address valid signal $X\_Valid_L$ and $X\_Valid_R$ and Y address valid signal $Y\_Valid_L$ and $Y\_Valid_R$. Therefore, the left and right image storage units 544 and 546 store pixel data in the valid addresses represented in a restricted region that is the shaded region with reference to FIG. 11. Because the stored data restricted within the shaded region is read during a read operation, the left and right images having sizes of the shaded region are read and provided to the image mixing unit 550.

The image mixing unit 550 respectively shifts the left and right images read from the image storage unit 540 and adjusts zero parallaxes with each other by overlapping so that the overlapped image is mixed with a stereoscopic image having parallax. The mixed stereoscopic image is shown on the stereoscopic display.

Figure 12:
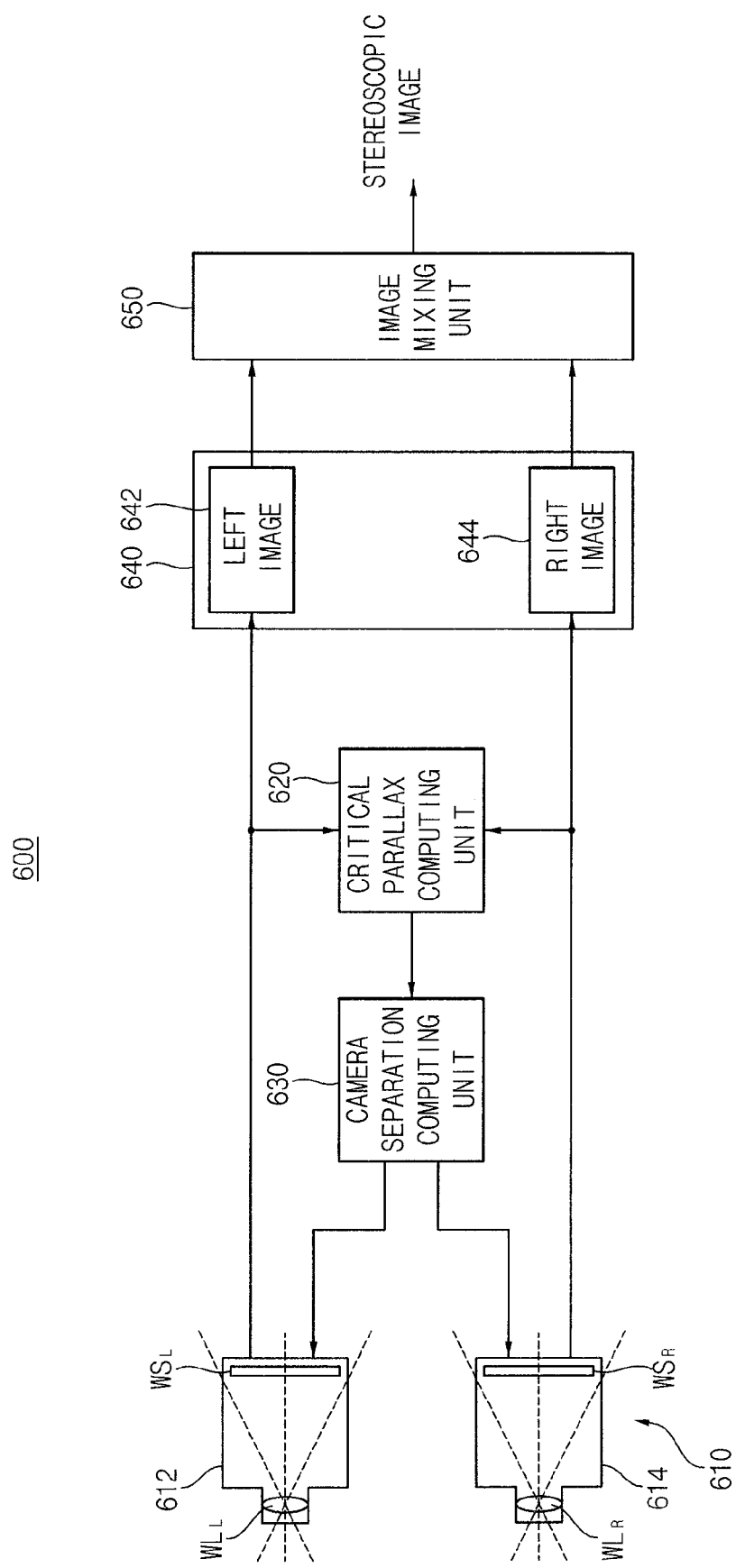
FIG. 12 is a block diagram illustrating still another example embodiment of an OSMU-type stereoscopic camera.
Figure 13:
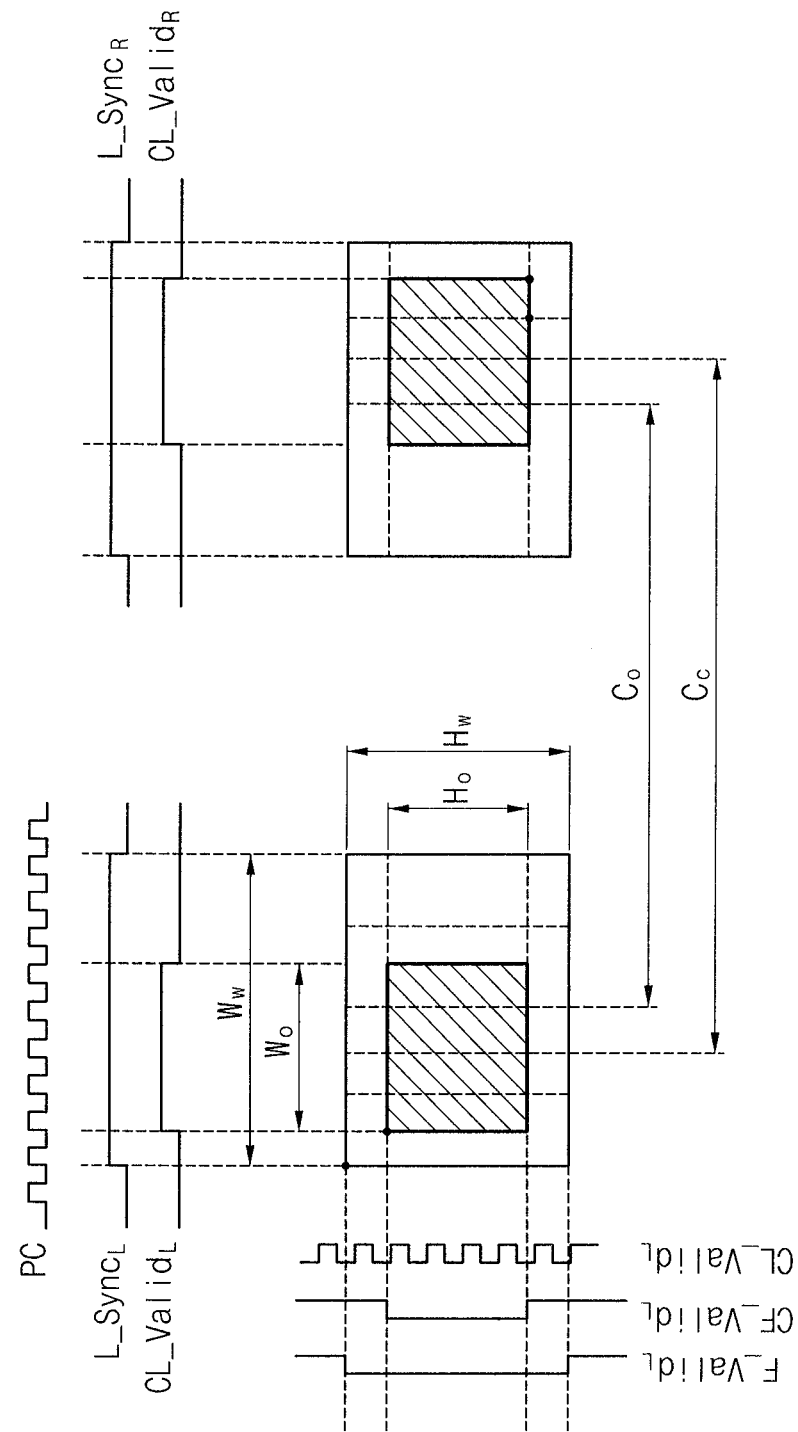
FIG. 13 is a diagram for describing a pixel data output operation of image sensors in FIG. 12.

FIG. 12 is a block diagram illustrating a fifth example embodiment of an OSMU-type stereoscopic camera and FIG. 13 is a diagram for describing an output operation of pixel data of image sensors in FIG. 12.

Compared to other example embodiments, the fifth example embodiment with reference to FIG. 12 readjusts pixel data output from image sensors $WS_L$ and $WS_R$ having the FOV corresponding to the wide imaging area $W_W \times H_W$ in response to a computed separation between cameras. Referring to FIG. 12, a stereoscopic camera 600 may include a camera unit 610, a critical parallax computing unit 620, a camera separation computing unit 630, an image storage unit 640, and an image mixing unit 650.

The camera unit 610 may include a left camera 612 and a right camera 614. The left and right cameras 612 and 614 are aligned parallel with each other in fixed locations. The left and right camera 612 and 614 includes left and right wide image sensors $WS_L$ and $WS_R$ and left and right wide lenses $WL_L$ and $WL_R$. The sizes of the left and right wide image sensors $WS_L$ and $WS_R$ and left and right wide lenses $WL_L$ and $WL_R$ are greater than the above-mentioned left and right image sensors $S_L$ and $S_R$ and lenses $L_L$ and $L_R$ of the first and second example embodiments by means of including a maximum allowable moving distance of the left and right image sensors $S_L$ and $S_R$ and lenses $L_L$ and $L_R$. Referring to FIG. 13, the left and right wide image sensors $WS_L$ and $WS_R$ may have the FOV corresponding to the wide imaging area $W_W \times H_W$ which is greater than the display imaging area $W_O \times H_O$.

The wide image sensors $WS_L$ and $WS_R$ output wide imaging area-size $W_W \times H_W$ pixel data in response to line valid signals $L\_Valid_L$ and $L\_Valid_R$ and frame valid signals $F\_Valid_L$ and $F\_Valid_R$ as illustrated in FIG. 13.

The wide image sensors $WS_L$ and $WS_R$ of the fifth example embodiment output display imaging area display-size $W_O \times H_O$ pixel data in response to adjusted line valid signals $CL\_Valid_L$ and $CL\_Valid_R$ and adjusted frame valid signals $CF\_Valid_L$ and $CF\_Valid_R$ as illustrated in FIG. 13. The adjusted line valid signals $CL\_Valid_L$ and $CL\_Valid_R$ and adjusted frame valid signals $CF\_Valid_L$ and $CF\_Valid_R$ are generated in response to a separation computed by the camera separation computing unit 630. Therefore, in the wide image sensors $WS_L$ and $WS_R$, a valid section of a pixel clock signal PC is adjusted by the adjusted line valid signals $CL\_Valid_L$ and $CL\_Valid_R$ so that only pixel data corresponding to the valid section in a first line is output as valid line data. A valid section of adjusted line valid signals $CL\_Valid_L$ and $CL\_Valid_R$ is adjusted by the adjusted frame valid signals $CF\_Valid_L$ and $CF\_Valid_R$ so that only line data corresponding to the valid section in a first frame is output as valid frame data.

The critical parallax computing unit 620 adjusts the stereoscopic camera having a fixed separation between cameras to an object and determines the far point of an image of which the focus has been adjusted to the object. The critical parallax computing unit 620 computes a maximum allowable critical parallax at the far point of the image based on the far point limit parallax of medium-size stereoscopic display.

The camera separation computing unit 630 computes the separation between virtual cameras based on the computed critical parallax.

The image storage unit 640 receives the left and right images output from the image sensors and stores the received left and right images.

The image mixing unit 650 respectively shifts the left and right images stored in the image storage unit 640 to converge the zero parallax of each image by overlapping the left and right images. The overlapped image is mixed with the stereoscopic image having the parallax. The mixed stereoscopic image is shown on the stereoscopic display.

Industrial Applicability

The stereoscopic image made by the example embodiments of the present invention may be viewed on various display sizes, such as mobile cell phones, desktop monitors, televisions, large-screen projection televisions, and movie screens so that the stereoscopic video content market may be expanded.

Having described the example embodiments of the present invention and its advantages, it is noted that various changes, substitutions and alterations can be made herein without departing from the spirit and scope of the invention as defined by appended claims.

What is claimed is:

1. A one source multi use (OSMU) type stereoscopic camera, comprising:
   left and right cameras aligned with parallel optical axes;
   a separation adjustment unit configured to adjust a separation between the left and right cameras;
   a critical parallax computing unit configured to adjust the focus of a stereoscopic camera to an object and determine a far point of an image, the focus of which has been adjusted to the object so that a maximum critical parallax is computed based on a far point limit parallax of a medium-size stereoscopic display on condition that the separation between the optical axes is set to an arbitrary value;
   a camera separation computing unit configured to compute the separation between the parallel optical axes based on the computed critical parallax and drive the separation adjustment unit in response to the computed separation; and
   an image storage unit configured to store left and right images photographed by left and right cameras readjusted by the camera separation computing unit,
   wherein the critical parallax is represented by the following equation:

$$P_S = P_D \times (W_S W_D)$$

wherein,
   $P_S$ denotes the critical parallax at a far point of an image sensor of one of the left and right cameras,
   $W_S$ denotes the horizontal width of the image sensor,
   $P_D$ denotes the far point limit parallax of the medium-size stereoscopic display, and
   $W_D$ denotes the horizontal width of the medium-size stereoscopic display.

2. The OSMU-type stereoscopic camera of claim 1, wherein the medium-size stereoscopic display is a desktop monitor having a size within a range of 17" to 24".

3. The OSMU-type stereoscopic camera of claim 1, wherein the far point limit parallax of the medium-size stereoscopic display is approximately 2.79% of an optimal convergence distance.

4. The OSMU-type stereoscopic camera of claim 1, wherein the readjusted separation between the parallel optical axes is represented by the following equation:

$$C_C = P_S / Z_S (1/Z_O - 1/Z_F)$$

wherein,
$C_c$ denotes the readjusted separation between the parallel optical axes,
$Z_S$ denotes the distance from the center of a lens of the stereoscopic camera to the image sensor,
$Z_O$ denotes the vertical distance from the center of the lens to the object, and
$Z_F$ denotes the vertical distance from the center of the lens to a far point object at the back of the object.

5. A method of making one source multi use type (OSMU-type) stereoscopic video content, comprising:
adjusting the focus of a stereoscopic camera, of which a separation between parallel optical axes is set to an arbitrary value, to an object;
determining a far point of an image of which the focus is adjusted to the object;
computing a maximum allowable critical parallax at the far point of the image based on a far point limit parallax of a medium-size stereoscopic display;
readjusting the separation between the parallel optical axes based on the computed critical parallax; and
photographing of the object by the readjusted stereoscopic camera,
wherein the maximum allowable critical parallax is represented by the following equation:

$$P_S = P_D \times (W_S W_D)$$

wherein,
$P_S$ denotes the critical parallax at a far point of an image sensor of the stereoscopic camera,
$W_S$ denotes the horizontal width of the image sensor,
$P_D$ denotes the far point limit parallax of the medium-size stereoscopic display, and
$W_D$ denotes the horizontal width of the medium-size stereoscopic display.

6. The method of claim 5, wherein the medium-size stereoscopic display is a desktop monitor.

7. The method of claim 6, wherein the desktop monitor has a size within a range of 17" to 24".

8. The method of claim 5, wherein the far point limit parallax of the medium-size stereoscopic display is approximately 2.79% of an optimal viewing distance of the stereoscopic display.

9. The method of claim 5, wherein the readjusted separation between the parallel optical axes is represented by the following equation:

$$C_c = P_S/Z_S(1/Z_0 - 1/Z_F)$$

wherein,
$C_c$ denotes the readjusted separation between the parallel optical axes,
$Z_S$ denotes the distance from the center of a lens of the stereoscopic camera to the image sensor,
$Z_0$ denotes the vertical distance from the center of the lens to the object, and
$Z_F$ denotes the vertical distance from the center of the lens to far point object at the back of the object.

10. The method of claim 5, further comprising:
generating a single stereoscopic image by mixing left and right images photographed by the stereoscopic camera.

11. A one source multi use type (OSMU-type) stereoscopic camera, comprising:
left and right cameras aligned to have parallel optical axes;
a sensor separation adjustment unit configured to adjust a separation between image sensors on condition that the separation between the left and right cameras is fixed;
a critical parallax computing unit configured to adjust the focus of a stereoscopic camera to an object and determine a far point of an image, the focus of which has been adjusted to the object, so that a maximum allowable critical parallax is computed based on a far point limit parallax of a medium-size stereoscopic display on condition that the separation between the image sensors is set to an arbitrary value;
a camera separation computing unit configured to compute the separation between the image sensors based on the computed critical parallax and drive the sensor separation adjustment unit in response to the computed separation; and
an image storage unit configured to store left and right images photographed by left and right cameras readjusted by the camera separation computing unit, wherein the critical parallax is represented by the following equation:

$$P_S = P_D \times (W_S/W_D)$$

wherein,
$P_S$ denotes the critical parallax of the far point of an image sensor of one of the left and right cameras,
$W_S$ denotes the horizontal width of the image sensor,
$P_D$ denotes the far point limit parallax of the medium-size stereoscopic display, and
$W_D$ denotes the horizontal width of the medium-size the stereoscopic display.

12. The OSMU-type stereoscopic camera of claim 11, wherein the medium-size stereoscopic display has a size within a range of 17" to 24".

13. The OSMU-type stereoscopic camera of claim 11, wherein the far point limit parallax of the medium-size stereoscopic display is approximately 2.79% of an optimal viewing distance.

14. The OSMU-type stereoscopic camera of claim 11, wherein the readjusted separation between the parallel optical axes is represented by the following equation:

$$C_c = P_S/Z_S(1/Z_0 - 1/Z_F)$$

wherein,
$C_c$ denotes the readjusted separation between the parallel optical axes,
$Z_S$ denotes the distance from the center of a lens of the stereoscopic camera to the image sensor,
$Z_0$ denotes the vertical distance from the center of the lens to the object, and
$Z_p$ denotes the vertical distance from the center of the lens to a far point object at the back of the object.

15. A method of making one source multi use type (OSMU-type) stereoscopic video content, comprising:
adjusting the focus of a stereoscopic camera to an object on condition that a separation between the parallel optical axes of image sensors is set to an arbitrary value;
determining a far point of an image of which the focus is adjusted to the object;
computing a maximum allowable critical parallax at the far point of the image based on a far point limit parallax of a medium-size stereoscopic display;
readjusting the separation between the left and right image sensors based on the computed critical parallax; and
photographing of the object by the readjusted stereoscopic camera, wherein the critical parallax is represented by the following equation:

$$P_S = P_D \times (W_S/W_D)$$

wherein,
$P_S$ denotes the critical parallax of the far point of an image sensor of the stereoscopic camera,
$W_S$ denotes the horizontal width of the image sensor,
$P_D$ denotes the far point limit parallax of the medium-size stereoscopic display, and $W_D$ denotes the horizontal width of the medium-size the stereoscopic display.

16. The method of claim 15, wherein the medium-size stereoscopic display is a desktop monitor.

17. The method of claim 16, wherein the desktop monitor has a size within a range of 17" to 24".

18. The method of claim 15, wherein the far point limit parallax of the medium-size stereoscopic display is approximately 2.79% of an optimal viewing distance of the stereoscopic display.

19. The method of claim 15, wherein the readjusted separation between the left and right image sensors is represented by the following equation:

$$C_C = P_S/Z_S(1/Z_0 - 1/Z_F)$$

wherein,
$C_c$ denotes the readjusted separation between the parallel optical axes,
$Z_S$ denotes the distance from the center of a lens of the stereoscopic camera to the image sensor,
$Z_0$ denotes the vertical distance from the center of the lens to the object, and
$Z_r$ denotes the vertical distance from the center of the lens to far point object at the back of the object.

20. The method of claim 15, further comprising:
generating a single stereoscopic image by mixing left and right images photographed by the stereoscopic camera.

21. A one source multi use type (OSMU-type) stereoscopic camera, comprising:
left and right cameras aligned with parallel optical axes;
a lens separation adjustment unit for adjusting a separation between left and right lenses on condition of the separation between image sensors in the cameras being fixed;
a critical parallax computing unit configured to adjust the focus of a stereoscopic camera to an object and determine a far point of an image, the focus of which has been adjusted to the object, so that a maximum critical parallax is computed based on a far point limit parallax of a medium-size stereoscopic display on condition that the separation between the lenses in the stereoscopic camera is set to an arbitrary value;
a camera separation computing unit configured to compute the separation between the lenses based on the computed critical parallax and drive the lens separation adjustment unit in response to the computed separation; and
an image storage unit configured to store left and right images photographed by the left and right cameras of which the separation between the lenses is readjusted by the camera separation computing unit, wherein the critical parallax is represented by the following equation:

$$P_S = P_D \times (W_S/W_D)$$

wherein,
$P_S$ denotes the critical parallax of the far point of an image sensor of one of the left and right cameras,
$W_S$ denotes the horizontal width of the image sensor,
$P_D$ denotes the far point limit parallax of the medium-size stereoscopic display, and
$W_D$ denotes the horizontal width of the medium-size the stereoscopic display.

22. A method of making one source multi use type (OSMU-type) stereoscopic video content, comprising:
adjusting the focus of a stereoscopic camera to an object on condition that a separation between left and right lenses having parallel optical axes is set to an arbitrary value;
determining a far point of an image of which the focus has been adjusted to the object;
computing a maximum allowable critical parallax at the far point of the image based on a far point limit parallax of a medium-size stereoscopic display;
readjusting the separation between the left and right lenses based on the computed critical parallax;
photographing of the object by the readjusted stereoscopic camera, wherein the critical parallax is represented by the following equation:

$$P_S = P_D \times (W_S/W_D)$$

wherein,
$P_S$ denotes the critical parallax of the far point of an image sensor of the stereoscopic camera,
$W_S$ denotes the horizontal width of the image sensor,
$P_D$ denotes the far point limit parallax of the medium-size stereoscopic display, and
$W_D$ denotes the horizontal width of the medium-size the stereoscopic display.

23. A method of making one source multi use type (OSMU-type) stereoscopic video content configured to take stereoscopic images adapting to a maximum allowable critical parallax based on the most unfavorable display watching conditions, wherein the maximum allowable critical parallax is represented by the following equation:

$$P_s = P_D \times (W_S W_D)$$

wherein,
$P_S$ denotes the critical parallax at a far point of an image sensor of the stereoscopic camera,
$W_S$ denotes the horizontal width of the image sensor,
$P_D$ denotes the far point limit parallax of the medium-size stereoscopic display, and
$W_D$ denotes the horizontal width of the medium-size stereoscopic display.

24. A one source multi use type (OSMU-type) stereoscopic camera, comprising:
left and right cameras including image sensors and wide lenses on condition that parallel optical axes of the lenses is fixed, each of the image sensors and wide lenses having a field of view corresponding to a wide imaging area which is greater than a native imaging area;
a critical parallax computing unit configured to adjust the focus of a stereoscopic camera to an object and determine a far point of an image, the focus of which has been adjusted to the object, so that a maximum critical parallax is computed based on a far point limit parallax of a medium-size stereoscopic display on condition that a separation between the cameras is fixed;
a camera separation computing unit configured to compute the separation between the parallel optical axes based on the computed critical parallax; and
an image storage unit configured to store wide left and right images photographed by left and right cameras and output left and right display images in response to the separation computed by the camera separation computing unit during a read operation, wherein the critical parallax is represented by the following equation:

$$P_S = P_D \times (W_S/W_D)$$

wherein,
$P_S$ denotes the critical parallax of the far point of an image sensor of one of the left and right cameras,
$W_S$ denotes the horizontal width of the image sensor,
$P_D$ denotes the far point limit parallax of the medium-size stereoscopic display, and $W_D$ denotes the horizontal width of the medium-size the stereoscopic display.

25. A method of making one source multi use type (OSMU-type) stereoscopic video content, comprising:
   photographing of an object by a stereoscopic camera including image sensors and wide lenses having fields of view corresponding to wide imaging areas, the stereoscopic camera being set to have a fixed separation;
   storing the photographed left and right image having the wide imaging areas; determining a far point of an image of which the focus has been adjusted to the object;
   computing a maximum allowable critical parallax at the far point of the image based on a far point limit parallax of a medium-size stereoscopic display;
   resetting display image read addresses of desired display images from the stored wide imaging area images in response to the computed separation based on the computed critical parallax; and
   reading left and right display images in response to the reset read addresses, wherein the critical parallax is represented by the following equation:

$$P_S = P_D \times (W_S/W_D)$$

wherein,
$P_S$ denotes the critical parallax of the far point of an image sensor of the stereoscopic camera,
$W_S$ denotes the horizontal width of the image sensor,
$P_D$ denotes the far point limit parallax of the medium-size stereoscopic display, and
$W_D$ denotes the horizontal width of the medium-size the stereoscopic display.

26. A one source multi use type (OSMU-type) stereoscopic camera, comprising:
   left and right cameras including image sensors and wide lenses on condition that optical axes of the wide lenses being fixed with parallel optical axes, each of the image sensors and wide lenses having a filed of view corresponding to a wide imaging area which is greater than a native imaging area;
   a critical parallax computing unit configured to adjust the focus of the stereoscopic camera to an object and determine a far point of an image of which the focus of the image has been adjusted to the object, so that a maximum allowable critical parallax at the far point of the image is computed based on a far point limit parallax of the medium-size stereoscopic display on condition that a separation between the parallel optical axes is fixed;
   a camera separation computing unit configured to compute the separation between the parallel optical axes based on the computed critical parallax; and
   an image storage unit configured to write display-size left and right images among wide-area left and right images picked up by the left and right cameras in response to the separation computed by the camera separation computing unit, wherein the critical parallax is represented by the following equation:

$$P_S = P_D \times (W_S/W_D)$$

wherein,
$P_S$ denotes the critical parallax of the far point of an image sensor of one of the left and right cameras,
$W_S$ denotes the horizontal width of the image sensor,
$P_D$ denotes the far point limit parallax of the medium-size stereoscopic display, and
$W_D$ denotes the horizontal width of the medium-size the stereoscopic display.

27. A method of making one source multi use type (OSMU-type) stereoscopic video content, comprising:
   photographing of an object by a stereoscopic camera including image sensors and wide lenses on condition that the stereoscopic camera is set to have a fixed separation between cameras, each of the image sensors and wide lenses having a filed of view corresponding to a wide imaging area which is greater than a native imaging area;
   determining the far point of an image of which the focus has been adjusted to the photographed object;
   computing a maximum allowable critical parallax at a far point of the image based on a far point limit parallax of a medium-size stereoscopic display;
   computing the separation between the cameras based on the computed critical parallax;
   storing display-size left and right images among wide-area images in response to the computed separation between cameras, wherein the critical parallax is represented by the following equation:

$$P_S = P_D \times (W_S/W_D)$$

wherein,
$P_S$ denotes the critical parallax of the far point of an image sensor of the stereoscopic camera,
$W_S$ denotes the horizontal width of the image sensor,
$P_D$ denotes the far point limit parallax of the medium-size stereoscopic display, and
$W_D$ denotes the horizontal width of the medium-size the stereoscopic display.

28. A one source multi use type (OSMU-type) stereoscopic camera, comprising:
   left and right cameras including image sensors and wide on condition that optical axes of the wide lenses being fixed parallel to each other, each of the image sensors and wide lenses having a filed of view corresponding to a wide imaging area which is greater than a native imaging area;
   a critical parallax computing unit configured to adjust the focus of the stereoscopic camera to an object and determine a far point of an image of which the focus has been adjusted to the object, so that a maximum allowable critical parallax at the far point of the image is computed based on a far point limit parallax of a medium-size stereoscopic display on condition that a separation between the optical axes is fixed;
   a camera separation computing unit configured to compute the separation between the parallel optical axes based on the computed critical parallax;
   an image storage unit configured to store left and right images picked up by the left and right cameras, and wherein each of the image sensors of the left and right cameras output only display sized pixel data in response to the computed separation, wherein the critical parallax is represented by the following equation:

$$P_S = P_D \times (W_S/W_D)$$

wherein,
$P_S$ denotes the critical parallax of the far point of an image sensor of one of the left and right cameras,
$W_S$ denotes the horizontal width of the image sensor,
$P_D$ denotes the far point limit parallax of the medium-size stereoscopic display, and
$W_D$ denotes the horizontal width of the medium-size the stereoscopic display.

29. A method of making one source multi use type (OSMU-type) stereoscopic video content, comprising:

photographing of an object by a stereoscopic camera including image sensors and wide lenses having wide imaging areas, the stereoscopic camera being set to have a fixed separation between cameras;

determining a far point of an image of which the focus has been adjusted to the photographed object;

computing a maximum critical parallax at the far point of the image based on a far point limit parallax of a medium-size stereoscopic display;

computing the separation between cameras based on the computed critical parallax;

outputting pixel data having a display size from the image sensors in response to the computed separation between cameras; and storing the output pixel data having the display size, wherein the critical parallax is represented by the following equation:

$$P_S = P_D \times (W_S/W_D)$$

wherein, $P_S$ denotes the critical parallax of the far point of an image sensor of the stereoscopic camera, $W_S$ denotes the horizontal width of the image sensor, $P_D$ denotes the far point limit parallax of the medium-size stereoscopic display, and $W_D$ denotes the horizontal width of the medium-size the stereoscopic display.

* * * * *